US011875621B2

(12) United States Patent
Kushnir

(10) Patent No.: US 11,875,621 B2
(45) Date of Patent: Jan. 16, 2024

(54) LOCK AND SWITCH CONTROLLER SYSTEM, LOCK AND SWITCH DEVICE WITH OFFLINE RESPONSIVENESS, LOCK AND SWITCH CONTROLLER SYSTEM WITH FLEXIBLE COMMANDS

(71) Applicant: Marat Kushnir, Thornhill (CA)

(72) Inventor: Marat Kushnir, Thornhill (CA)

( * ) Notice: Subject to any disclaimer, the term of this patent is extended or adjusted under 35 U.S.C. 154(b) by 136 days.

(21) Appl. No.: 17/673,069

(22) Filed: Feb. 16, 2022

(65) Prior Publication Data

US 2022/0366742 A1 Nov. 17, 2022

Related U.S. Application Data

(63) Continuation-in-part of application No. 17/321,942, filed on May 17, 2021, now Pat. No. 11,348,389.

(51) Int. Cl.
*G07C 9/00* (2020.01)

(52) U.S. Cl.
CPC .................... *G07C 9/00309* (2013.01); *G07C 2009/00412* (2013.01)

(58) Field of Classification Search
None
See application file for complete search history.

(56) References Cited

U.S. PATENT DOCUMENTS

| | | | | |
|---|---|---|---|---|
| 9,842,491 B2 * | 12/2017 | Ariel | A63F 13/86 | |
| 9,858,739 B1 * | 1/2018 | Johnson | H04L 12/2816 | |
| 9,940,828 B2 * | 4/2018 | Hou | G08C 17/02 | |
| 10,425,899 B1 * | 9/2019 | Bonazzoli | H04W 52/0277 | |
| 10,867,507 B2 * | 12/2020 | Nachshon | H04N 21/4131 | |
| 11,348,389 B1 * | 5/2022 | Kushnir | G07C 9/00571 | |
| 2002/0198625 A1 * | 12/2002 | Paashuis | G07F 13/025 | 700/241 |
| 2005/0236905 A1 * | 10/2005 | Tsai | G07C 9/00182 | 340/13.24 |
| 2007/0289962 A1 * | 12/2007 | Kruempelmann | F24C 7/08 | 219/490 |
| 2010/0097464 A1 * | 4/2010 | Volpe | H04N 21/440281 | 348/143 |
| 2012/0313744 A1 * | 12/2012 | Vuyst | H04L 9/0631 | 340/4.3 |
| 2014/0129006 A1 * | 5/2014 | Chen | G05B 15/02 | 700/90 |

(Continued)

*Primary Examiner* — Carlos Garcia

(57) ABSTRACT

A lock and switch controller system, a lock and switch device with offline responsiveness, and system with flexible commands are present. The disclosure provides a lock and/or switch and controller system having a controller with a means of receiving readable alpha and/or numeric input manually from a user using a keypad or other means. The apparatus disclosed herein, provides for the compilation of commands, encrypted in the form of human readable tokens containing covert instructions for the remote control and management of target devices. Any instructions to an appliance or any other users' credentials can be encrypted by an administrator and/or owner and delivered to the controller of the appliance by a user without compromising any security. The lock and switch controller system operates independently and can accept new rules without the presence of the administrator or owner and without connectivity to any communications network.

24 Claims, 8 Drawing Sheets

(56) References Cited

U.S. PATENT DOCUMENTS

| | | | | |
|---|---|---|---|---|
| 2016/0232726 | A1* | 8/2016 | Zizi | G07C 9/257 |
| 2017/0052518 | A1* | 2/2017 | Wang | G05B 19/4183 |
| 2017/0105248 | A1* | 4/2017 | Dolinski | H05B 6/062 |
| 2017/0231058 | A1* | 8/2017 | Sadwick | H05B 45/18 |
| 2018/0062691 | A1* | 3/2018 | Barnett, Jr. | G06F 3/167 |
| 2018/0300816 | A1* | 10/2018 | Perl | G06Q 50/01 |
| 2019/0172274 | A1* | 6/2019 | Duan | F16H 59/00 |
| 2019/0179655 | A1* | 6/2019 | Ling | G06F 11/3058 |
| 2020/0021456 | A1* | 1/2020 | Wu | G06F 3/04886 |
| 2020/0359309 | A1* | 11/2020 | Morita | H04L 12/4625 |
| 2022/0366742 | A1* | 11/2022 | Kushnir | G07C 9/00817 |

* cited by examiner

LOCK AND SWITCH CONTROLLER SYSTEM, LOCK AND SWITCH DEVICE WITH OFFLINE RESPONSIVENESS, LOCK AND SWITCH CONTROLLER SYSTEM WITH FLEXIBLE COMMANDS

CROSS-REFERENCE TO RELATED APPLICATIONS

The present application claims priority to the U.S. patent application Ser. No. 17/321,942 which was filed on May 17, 2021, which is hereby incorporated by reference herein in its entirety, including any figures, tables, or drawings.

FIELD OF THE DISCLOSURE

This disclosure relates to a lock and switch controller system, a lock and switch device with offline responsiveness, and a lock and switch controller system with flexible commands. More specifically, and without limitation, the present disclosure relates to a lock and switch controller system with offline responsiveness and flexible commands for operating the lock and controller system and devices.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Marat Kushnir. All rights reserved.

BACKGROUND OF THE DISCLOSURE

Locks and fastening mechanisms are well known in the art. Generally speaking, a lock and/or a lock and key is a mechanical, and sometimes electrical, fastening device. The lock and/or lock and key is operated—operated meaning unlocked and/or opened and/or locked and/or closed—through use of a key or other type of security access. Some other types of security access include an electronic keycard, a magnetically activated keycard, a fingerprint reader, a radio frequency identification card or other wireless emitting device—such as a mobile phone—, and/or a password.

In this way, locks and keys have grown in recent times so that locks can be operated by more than just a key. The term key is now used to describe many different types of keys, not just metal or mechanical keys. Key may now be referred to a numeric code combination entered on a keypad or the like. This type of numeric combination on a keypad can allow for a user to remotely access or operate a lock without the need of a physical key such as a metal key or a key card.

Modern electronic keys are able to provide some advanced convenience over originally developed keys. For example, an electronic lock works by electric current and can be operated by a non physical key such as a keycard or other wireless transmission. In this way, the access signature for the lock must match the access signature on the card. Another similar type of lock is a remote keyless system or radio frequency key. This type of lock is commonly used in modern car remotes and may also be, similarly, found for garage door locks and/or door operators. In this way, modern locks can be operated by keycode, or even through wireless interne, bluetooth, mobile phones and the like. Wireless interne, bluetooth and mobile phones have been critical for remote access control and management.

In addition to locks, switches are a common feature found in the state of the art. At a basic level, a switch removes or restores the conducting path in a circuit. Switches are known in the art as an electrical component that connects or disconnects part of an electrical circuit thus interrupting the flow of current or diverting it from one conductor to another. In this way, a switch may be operated manually or by a moving object or by a sensing element such as pressure, temperature or flow. A switch will have one or more sets of contacts, which may operate simultaneously, sequentially, or alternately.

The most common type of switch, in the art, is a manually operated electromechanical device with one or more sets of electrical contacts, which are connected to external circuits. Each set of contacts can be in one of two states either "closed" where contacts are touching and electricity can flow between them, or "open" where contacts are separated and the switch is not conducting. The mechanism actuating the transition between the open or closed states is usually continuous by changing the position of the switch which remains in its new state or momentary where the switch remains in its state as long as it is being pushed.

In this way, switches are important in the state of the art because switches are used to ignite vehicles, control machinery or lighting, reverse electric motors, activate environmental sensors or trigger communications. A switch is also a means of activating an actuator which is commonly known as the part responsible for moving and controlling a mechanism. A switch is the "trigger" whilst an actuator is the "mover" which changes the source's energy into mechanical motion. In the context of the invention the term switch incorporates an actuator in so far as control of a device or apparatus is concerned.

A switch may be directly manipulated by a human or automatically operated to control the motions or functions of machines. Switches may be operated by process variables such as pressure, temperature, flow, current, voltage, and force, acting as sensors in a process and used to automatically control a system. Some switches are used to isolate electric power from a system and can be padlocked if necessary, to prevent accidental operation of a machine during maintenance or to prevent electric shock.

A switch, as an electromechanical toggle or push button device, can also occur in the form of a key. It may not only open or close thereby changing the electrical state of a device from off to on (or vice versa) but it may also change a device's status from being idle and unresponsive to being responsive to a user's commands.

The present disclosure refers particularly to control of functionality based on users' credentials and refers interchangeably to locks and switches concerning the ability to govern access to their respective functionality.

Thus, the present disclosure provides for a lock and switch controller system with this type of expanded functionality and more. The present disclosure provides for an alternative control lock and switch controller which can be remotely and/or locally programmed by an owner and/or administrator to enable or restrict certain functionality and/or access to others based on a user's credentials and the like.

The disclosure herein provides these advantages and others as will become clear from the specification and claims provided.

SUMMARY OF THE DISCLOSURE

A lock and switch controller system, a lock and switch device with offline responsiveness, and a lock and switch controller system with flexible commands are presented. More specifically, and without limitation, the present disclosure provides the state of the art with a lock and switch controller system with offline responsiveness and flexible commands for operating the lock and controller system and devices.

Thus, the present disclosure improves upon the state of the art for access and/or securement and provides the state of the art with a novel lock and a controller system.

Another object of the disclosure is to provide a lock and switch controller system, a lock and switch device with offline responsiveness, and a lock and switch controller system with flexible commands that integrates and/or replaces electronic switches.

Yet another object of the disclosure is to provide a lock and switch controller system, a lock and switch device with offline responsiveness, and a lock and switch controller system with flexible commands that integrates and/or replaces mechanical locks.

Another object of the disclosure is to provide a lock and switch controller system, a lock and switch device with offline responsiveness, and a lock and switch controller system with flexible commands that provide operation logic and electronic circuitry so that an owner and/or administrator can remotely control a lock without any direct access to the lock and/or without any wireless communication with the lock. In other words, and said another way, the system provides flexible commands that provide operation logic and electronic circuitry so that an owner and/or administrator can remotely control a lock even when the device is offline. In this arrangement, and in this way, when reference is made to being offline, it means that the lock and/or switch is remotely controllable, manageable, and configurable without such lock or switch having any wireless communication capability and without any connectivity to the interne.

Yet another object of the disclosure is to provide a lock and switch controller system, a lock and switch device with offline responsiveness, and a lock and switch controller system with flexible commands that provide operation logic and electronic circuitry so that an owner and/or administrator can access the controlling switch and/or actuator while the components are offline.

Another object of the disclosure is to provide a lock and switch controller system, a lock and switch device with offline responsiveness, and a lock and switch controller system with flexible commands that provide operation logic and electronic circuitry so that an owner and/or administrator can remotely control a lock while the lock is not connected to any communication network.

Yet another object of the disclosure is to provide a lock and switch controller system, a lock and switch device with offline responsiveness, and a lock and switch controller system with flexible commands that provide operation logic and electronic circuitry so that an owner and/or administrator can access the controlling switch and/or actuator while the components are not connected to any communication network.

Another object of the disclosure is to provide a lock and switch controller system, a lock and switch device with offline responsiveness, and a lock and switch controller system with flexible commands that can still manage and provide access control to a premise, room, locker, safe, equipment, and/or other facility or operational device where access or usage credentials require monitoring and control.

Yet another object of the disclosure is to provide a lock and switch controller system, a lock and switch device with offline responsiveness, and a lock and switch controller system with flexible commands that can still manage and provide access where access or usage credentials require monitoring and control when not communicatively connected and/or offline.

Another object of the disclosure is to provide a lock and switch controller system, a lock and switch device with offline responsiveness, and a lock and switch controller system with flexible commands that reduces and/or eliminates the limitations of existing locks and/or switches due to duplication, loss, time, compromise, rigidity, stagnation, visibility, locality, gadget connectivity concerns, and the like.

Yet another object of the disclosure is to provide a lock and switch controller system, a lock and switch device with offline responsiveness, and a lock and switch controller system with flexible commands that solves problems plaguing the art, including, but not limited to, those associated with conventional system and devices by providing an innovative control system.

Another object of the disclosure is to provide a lock and switch controller system, a lock and switch device with offline responsiveness, and a lock and switch controller system with flexible commands that solves problems plaguing the art by providing a convenient and effective means of controlling switches and/or locks while incorporating other features, components, and functionality.

Yet another object of the disclosure is to provide a lock and switch controller system, a lock and switch device with offline responsiveness, and a lock and switch controller system with flexible commands that provide for the ability to control and/or manipulate the lock and switch controller disclosed herein through a novel means of control, such that the lock can be used to control and/or provide controlled access to target securements.

Another object of the disclosure is to provide a lock and switch controller system, a lock and switch device with offline responsiveness, and a lock and switch controller system with flexible commands that uses a sequence or sequences of symbols as an encrypted means, or code for controlling the lock and switch.

Yet another object of the disclosure is to provide a lock and switch controller system, a lock and switch device with offline responsiveness, and a lock and switch controller system with flexible commands that provides for a sequence or sequences of symbols, in human readable form, as an encryption means within the lock and/or controller.

Another object of the disclosure is to provide a lock and switch controller system, a lock and switch device with offline responsiveness, and a lock and switch controller system with flexible commands that contains various functions associated with a user's code; including but not limited to, setting access limits, user types, and/or operational and other programming functions.

Yet another object of the disclosure is to provide a lock and switch controller system, a lock and switch device with offline responsiveness, and a lock and switch controller system with flexible commands that provide a replacement lock mechanism.

Another object of the disclosure is to provide a lock and switch controller system, a lock and switch device with offline responsiveness, and a lock and switch controller system with flexible commands that provide a retrofit lock mechanism.

Yet another object of the disclosure is to provide a lock and switch controller system, a lock and switch device with offline responsiveness, and a lock and switch controller system with flexible commands that provide a unique controller system.

Another object of the disclosure is to provide a lock and switch controller system, a lock and switch device with offline responsiveness, and a lock and switch controller system with flexible commands that is easy to use.

Yet another object of the disclosure is to provide a lock and switch controller system, a lock and switch device with offline responsiveness, and a lock and switch controller system with flexible commands that can run autonomously.

Another object of the disclosure is to provide a lock and switch controller system, a lock and switch device with offline responsiveness, and a lock and switch controller system with flexible commands that tracks historical data.

Yet another object of the disclosure is to provide a lock and switch controller system, a lock and switch device with offline responsiveness, and a lock and switch controller system with flexible commands that provides alerts.

Another object of the disclosure is to provide a lock and switch controller system, a lock and switch device with offline responsiveness, and a lock and switch controller system with flexible commands that is safe to use.

Yet another object of the disclosure is to provide a lock and switch controller system, a lock and switch device with offline responsiveness, and a lock and switch controller system with flexible commands that are accurate.

Another object of the disclosure is to provide a lock and switch controller system, a lock and switch device with offline responsiveness, and a lock and switch controller system with flexible commands that works with various digital platforms.

Yet another object of the disclosure is to provide a lock and switch controller system, a lock and switch device with offline responsiveness, and a lock and switch controller system with flexible commands that is quick and efficient.

Another object of the disclosure is to provide a lock and switch controller system, a lock and switch device with offline responsiveness, and a lock and switch controller system with flexible commands that are robust.

Yet another object of the disclosure is to provide a lock and switch controller system, a lock and switch device with offline responsiveness, and a lock and switch controller system with flexible commands that can be programmed to various predetermined rule sets.

Another object of the disclosure is to provide a lock and switch controller system, a lock and switch device with offline responsiveness, and a lock and switch controller system with flexible commands that saves time for a user.

Yet another object of the disclosure is to provide a lock and switch controller system, a lock and switch device with offline responsiveness, and a lock and switch controller system with flexible commands that are high quality.

Another object of the disclosure is to provide a lock and switch controller system, a lock and switch device with offline responsiveness, and a lock and switch controller system with flexible commands that work remotely and do not require the presence or the proximity of the owner and/or administrator.

Yet another object of the disclosure is to provide a lock and switch controller system, a lock and switch device with offline responsiveness, and a lock and switch controller system with flexible commands that work remotely even when offline.

These and other objects, features, or advantages of the present disclosure will become apparent from the specification and claims.

DETAILED DESCRIPTION OF THE DISCLOSURE

Figure 1:
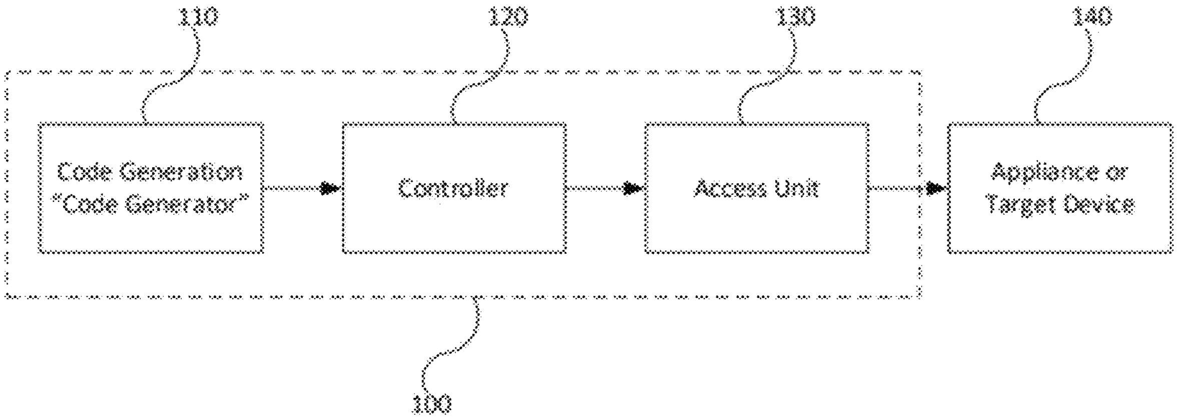
FIG. 1 is an illustration of one embodiment for operation of the system disclosed herein; the view showing a code generator; the view showing the controller; the view showing the access unit; the view showing an appliance and/or target device.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In the arrangement shown, as one example, a lock and controller system is presented. The lock system and controller system are for use with a device or appliance or residence that one desires to be secured. In some cases, an owner or administrator controls access and functionality. In some cases, a customer or client or user or employee is accessing based on a set of credentials.

The lock system disclosed may be built into a device or apparatus or location or may be retrofitted. Similarly, the present disclosure may be adapted to existing locks and/or switches that are capable of performing the functionality herein.

In the arrangement shown, as one example, the present disclosure provides for new features related to locks and/or switches, including but not limited to, the elimination of security shortcomings such as issues with unauthorized duplication, absence of physical keys, loss of physical keys, provides for instantaneous virtual key generation, and other components, features, and functionality.

In the arrangement shown, as one example, the present lock and controller system provides for security of master keys, such as those which might be found in industrial settings. The present disclosure also provides for configuring and/or re-configuration of master keys when needed.

In the arrangement shown, as one example, the present disclosure provides for changes in the access of the lock and/or controller system without the need to be present at the location of the lock. Furthermore, the present disclosure provides for changes in the access of the lock and/or controller system without the need for a communication network to be connected to and/or communicating with the lock system and/or controller system. Similarly, the present disclosure provides for the ability to change access among a group of people and/or a plurality of users (which use the same access code), which can be completed remotely and/or off site.

In the arrangement shown, the present disclosure provides and solves scalability issues plaguing the art. In other words, the lock and controller system provides flexibility and functionality related to controlling access to numerous locks and/or a plurality of lock systems simultaneously, such as, numerous facilities or doors, multiple containers or lockers and a variety of equipment and/or equipment types. Similarly, the present disclosure provides functionality and benefits for access to rural or other access points such as rural or remote locations, especially those for which wireless communication is not available or desired.

System:

With reference to the figures, a lock and switch controller system, a lock and switch device with offline responsiveness, and a lock and switch controller system with flexible commands 10 are presented. Lock and switch controller system, a lock and switch device with offline responsiveness, and a lock and switch controller system with flexible commands 10 (hereafter referred to as "lock system", "switch system", "controller system", "lock and controller system", "lock and switch controller system", "lock and switch device", or simply "system") is formed of any suitable size, shape and design.

In the arrangement shown, as one example, the lock and switch controller system 10 is an electronic switch including a locking device and/or mechanical locking device. In this arrangement, the lock and switch controller system 10 is used to secure an appliance and provide access to users even when the system is offline and/or lacks a connection to a communication network. In the arrangement shown, as one example, the users and/or access codes can be changed, remotely, even when the lock mechanism and system 10 are not connected to a communication network.

In the arrangement shown, as one example, system 10 includes operation logic and electronic circuitry. In this way, system 10 provides an owner and/or administrator the ability to remotely control the lock and/or access the controlling switch and/or access the features and functionality of the actuator mounted to an apparatus and/or retrofitted. This functionality, with system 10, is available to an owner and/or administrator even when the lock system is offline and/or not connected to a communication network. In this way, an owner and/or administrator can control and/or restrict access to a locked appliance, whether the appliance is a premises, a room, a locker, a safe, a plurality of containers, equipment, a vehicle, or other secured appliances. Furthermore, and in this way, an administrator and/or owner can control operational functionality of the device where access and/or usage credentials require monitoring and control.

In this way, system 10 provides many advantages over the existing state of the art, including, but not limited to, duplication issues, loss of key issues, time savings, compromising or lost features, rigidity in functionality, stagnation, visibility, locality, gadget and/or connectivity concerns.

In the arrangement shown, as one example, lock system 10 may be embodied as a latch lock. In this arrangement, a latch lock would allow—and is commonly associated with—a door lock. Similarly, a latch lock version of lock system 10 can allow for opening and closing of doors, gates, and the like, as embodied herein.

In the arrangement shown, as one example, lock system 10 may be embodied as a switch device. In this arrangement, a switch device lock would allow—and is commonly associated with—an ignition switch for machinery and/or equipment and/or vehicles.

In the arrangement shown, as one example, lock system 10 may be embodied as an actuator. In this arrangement, an actuator lock system would allow—and is commonly associated with—control relays for the purpose of signaling, alarming, billing, or controlling access to features of an apparatus. For example, the lock device may control access to the floor of an elevator. Some users may have access to a particular floor at a given time, etc.

In the arrangement shown, as one example, system 10 also includes a code generator, a controller, an access unit, and an appliance, and communication and control components, among other components, features, and functionality.

In the arrangement shown, as one example, lock and controller system 10 may also include remote servers, databases, application servers, application databases, appliance databases, databases, mobile applications, and/or computers; all of which in continuity or as separate acts fulfill the functions disclosed herein. Lock and controller system 10 also includes, in the embodiment(s) depicted, a graphical user interface, a user, a sensor system, a computing system, a communication and/or control system, an application server, and a mobile computing application, among other components, features, and functions.

Code Generator:

In the arrangement shown, as one example, system 10 includes a code generator 110 (also referred to herein as "code generation"). Code generator 110 is formed of any suitable size, shape, and design and is configured to generate codes, codes which will subsequently be input into the controller 120 (to be further described herein). In the arrangement shown, as one example, the code generated by the code generator 110 is encrypted and used to issue commands and/or other programming functions to the controller 120. In one arrangement, as is shown, the code generated by the code generator may be in human readable format. In one example, the code may be used for manual input into the controller's keypad. In another format, as another example, other formats are also hereby contemplated for use, including but not limited to a quick read code, a barcode, a sound tone, a combination thereof, and the like.

Controller:

In the arrangement shown, as one example, system 10 includes a controller 120. Controller 120 is formed of any suitable size, shape, and design and is configured to control the function of the access unit (as described herein). Said another way, the controller includes the electronic circuitry containing a microcontroller and/or processing units, which are connected to the lock or switch referred to as the access unit. In the arrangement shown, as one example, the controller contains the decryption key used for decrypting token 240 and logic with a variety of commands and/or reprogramming logic used for particular access units and appliances 250.

In the arrangement shown, as one example, the controller may also include command parameters. Command parameters are included within an encrypted token and provide instructions for the controller. Various command parameters include, but are not limited to, command type, serial number, access users—such as allowing access only once, allowing access multiple times, allowing access on a set count—, access type, access count, allow access before check in, check in date/time, duration, personal passcode option—such as allowing a user to select the passcode, prescribing a passcode to a user, and not allowing access to a user, personal passcode, override other users, allowed failed entries, consequence of failed entries, consequences of expiry, and the like.

In the arrangement shown, as one example, the command type may include allowing access until a given date and/or time, allowing access for a given duration, erasing access for existing respective user types, resetting tamper state, setting clock date or time, changing decoding key, a combination thereof, and the like.

In the arrangement shown, as one example, various consequences for failed entries may be included, including but not limited to, no consequence, blackout for specified duration of time, sounding an alarm—whether silent or noise—, closing the contactor, opening the contactor, initiating communication—whether initiating audio communication, visual communication, a combination thereof, and the like.

Access Unit:

In the arrangement shown, as one example, system 10 includes an access unit 130. Access unit 130 is formed of any suitable size, shape, and design and is configured as a lock or switch which controls functional access to an appliance. In the arrangement shown, as one example, the access unit is operably connected to and/or interacts with the controller (inclusively known as "switch controller system"). In the arrangement shown, as one example, the access unit typically also includes an integrated controller and also may include associated circuitry, and the like.

Appliance:

In the arrangement shown, as one example, system 10 is used in association with an appliance 140. Appliance 140 may be formed of any suitable size, shape, and design. In the arrangements shown, "appliance" is used generally to refer to the equipment which is being controlled. This includes a variety of locks such as latch locks, pad locks or deadbolt locks, switches, doors, safety boxes, machinery, vehicles, buildings, containers, and the like, for which system 10 is controlling access to and/or functionality of. Said another way, the appliance may be used to refer to the target device.

Control System:

In the arrangement shown, as one example, system 10 includes a control system 100. With reference to FIG. 1, control system 100 includes a plurality of processors and a plurality of memories, with the latter containing instructions that when executed by a processor trigger, a code generation 110 containing encrypted instructions which when input into a controller 120, provides directives to the access unit 130 and hence control of the appliance or target device 140. Such instructions may include routines, programs, objects, data structures, and the like.

In the arrangement shown, as one example, the control system 100 includes a controller 120. Controller 120 is configured to receive and interpret data generated by the code generator 110. The code generator generates code (data) that is encrypted and presented in human readable format covert instructions (in some circumstances; such as a numeric token) and can be transferred to a user verbally. This code may also be transferred by email, paper receipt, text, and the like. Furthermore, the controller 120 can accept the code in person through the manual input into a keypad 331 by a user, customer or guest.

In the arrangement shown, as one example, system 10 may include a customer, the customer receiving the encrypted token containing covert data from the code generator 110 by the administrator and/or owner of the system 10. This information can then be used to gain access to an appliance and/or reprogram the controller 120 without compromising security, and the like.

In the arrangement shown, as one example, the controller 120 may also include a plurality of cameras, microphones, scanners, bluetooth functionality, wireless connectivity features and functionality, other sensory equipment and the like. In the arrangement shown, as one example, an administrator and/or owner may opt to transfer the encrypted numeric token, containing covert instructions, instead of using a numeric token to be input into a keypad rather in the form of an image, a sound file, URL or file by email or through an application, and the like. In the arrangement shown, and in this example, if a customer receives such code format, this can be used via a smartphone, tablet, or other device with appropriate features 350 which can transfer the code to the controller using this transfer method and/or an alternative transfer method.

In the arrangement shown, as one example, code generator 110 may be implemented in the form of an application and may be implemented via a computer system (to be further described herein). Some examples may include a mainframe, personal computer, server, application server, mobile device, and the like. This application may be stored on a storage media as part of the control system 100 and locally accessible by the owner or administrator of a remote appliance.

In the arrangement shown, as one example, code generator 110 may include various code generating methods known in the art and provide data to be transferred to the controller 120, wherein the data can include one or more command parameters and can be used by the controller 120 to control an access unit 130 (as described herein), and a target device or appliance.

In this way, once the controller 120 has deciphered the input and/or instructions, the controller then functions in accordance with a predetermined set of rules, routines, and/or operations. This particular set of rules, routines, and/or operations may vary depending on the user and/or the particular appliance.

Figure 2:
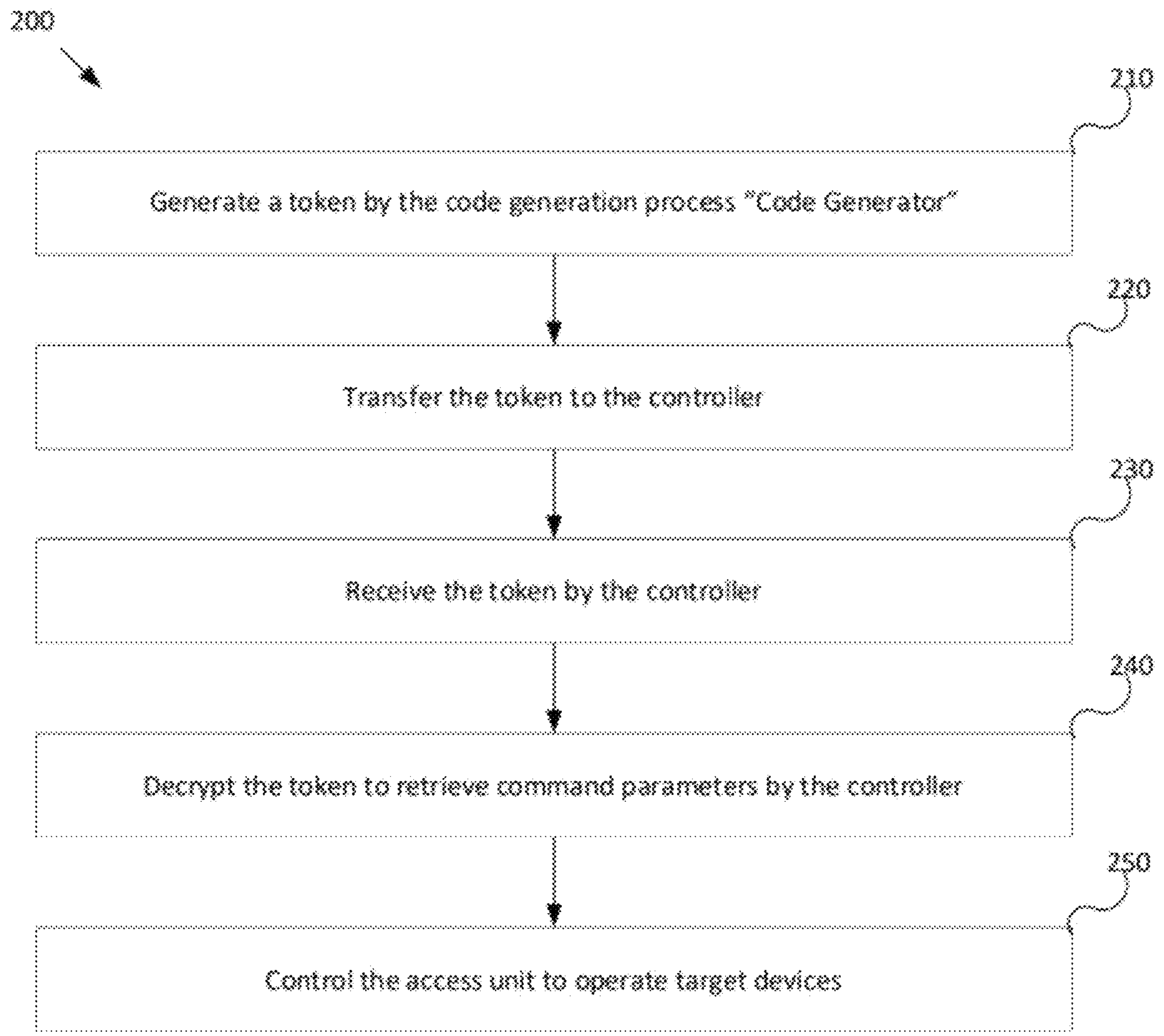
FIG. 2 is a diagram of one embodiment for operation of the system disclosed herein; the view showing a code generator generating a token; the view showing the transfer of the token; the view showing the controller receiving the token; the view showing decryption by the controller of the at least one command parameter; the view showing access being controlled for the access unit.

In the arrangement shown, as one example, system 10 includes a process 200 for controlling a target device or appliance. With reference to FIG. 2, the process 200 includes a block 210 which generates a code 110 containing encrypted command parameters presented in the form of a numeric readable token. This generated code or token is transferred at a block 220 to a controller. This transfer at block 220 occurs verbally and/or by paper receipt and/or text and/or any other means 330 between an administrator or owner of the target device and an intended user or guest of that device. The user or guest later inputs the token into the controller at block 230. The input of the token into the controller at block 230 occurs by manual entry by a user or a guest using a keypad or other means as described herein. Furthermore, the token is decrypted at block 240 providing functional instructions for the controller and/or access unit. In this way, the controller may contain a decryption key and logic algorithms with a list of commands and/or programming logic for one or more target devices and/or appliances. In this example, at block 250, the controller acts upon the access unit to operably manipulate a target device and/or appliance according to the functional instructions included in the command parameters.

In the arrangement shown, and in one example, system 10 also includes a computing device 320 of an administrator and/or owner (computing device to be further described herein).

Figure 5:
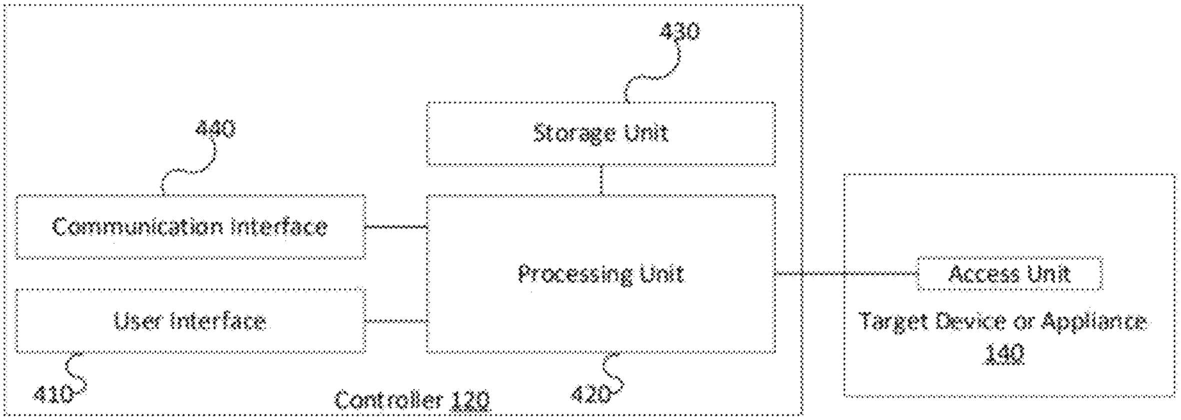
FIG. 5 is an illustration of one embodiment of a controller of the system and the access unit integrating with a user interface and other interfaces.
Figure 6:
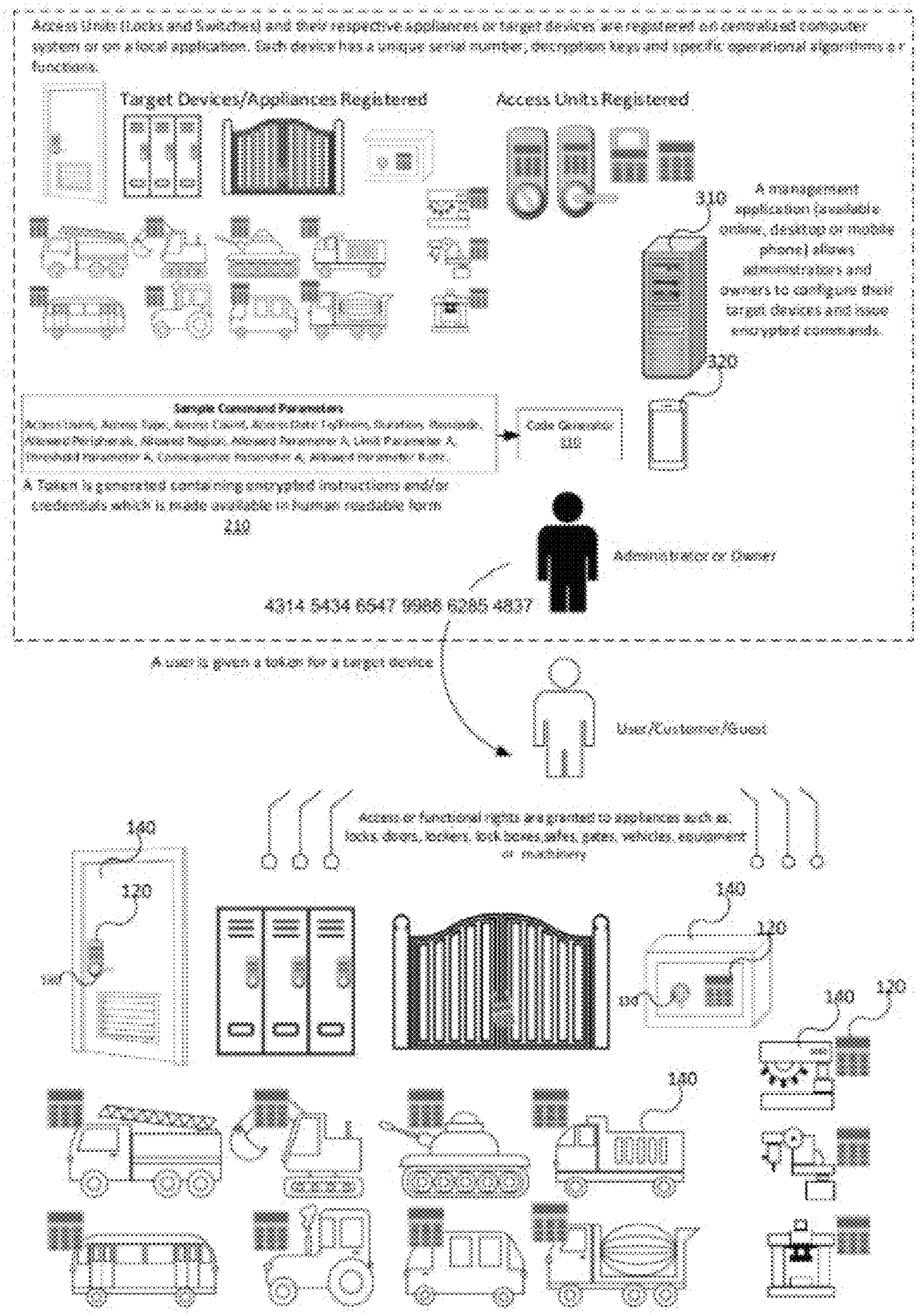
FIG. 6 is an overview of the operation of the system.
Figure 7:
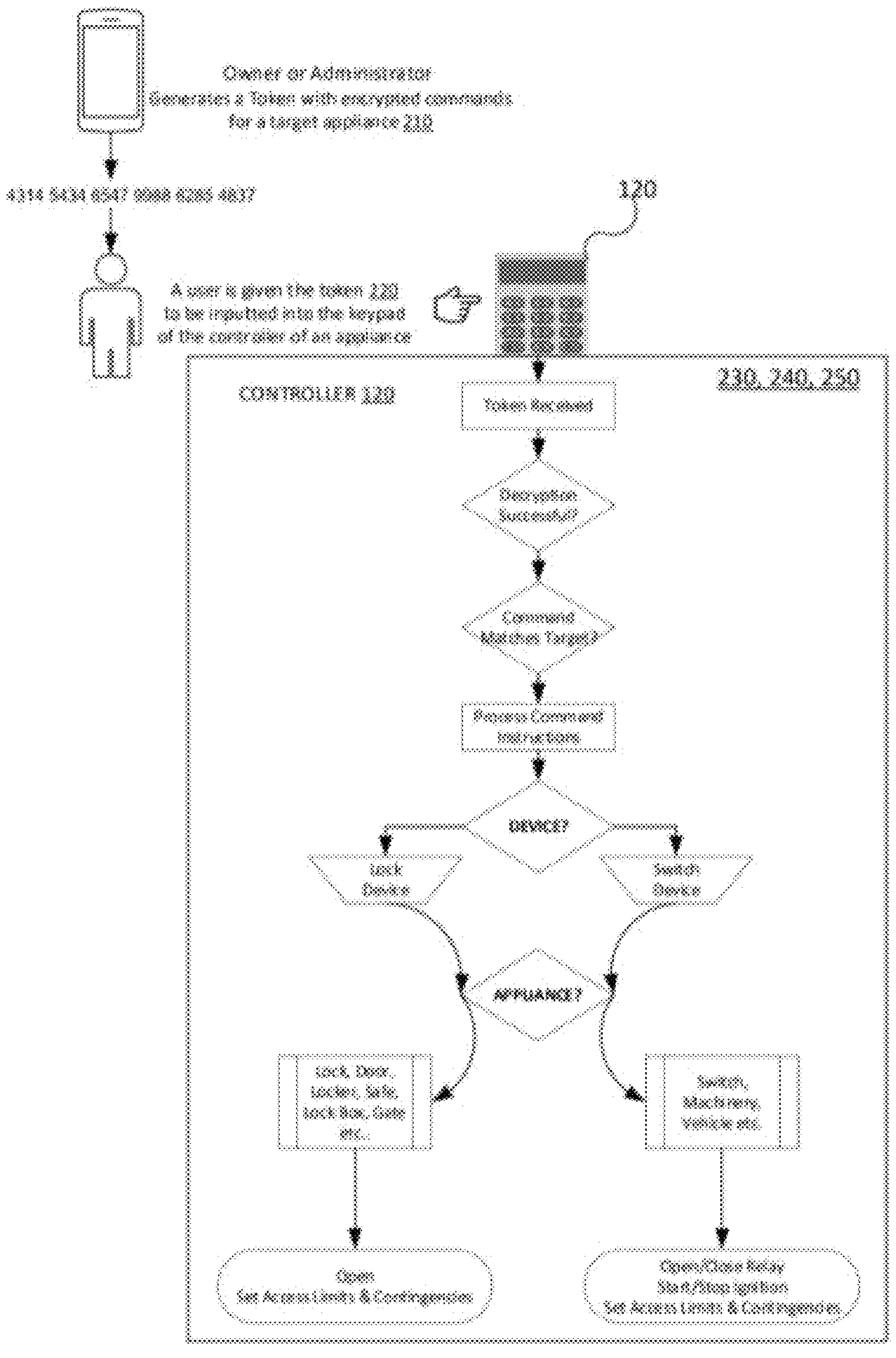
FIG. 7 is an illustration showing the relationship of the code generation and the functionality of the controller; the view showing an illustration of one embodiment of a controller of the system and the access unit integrating with an administrator.
Figure 8:
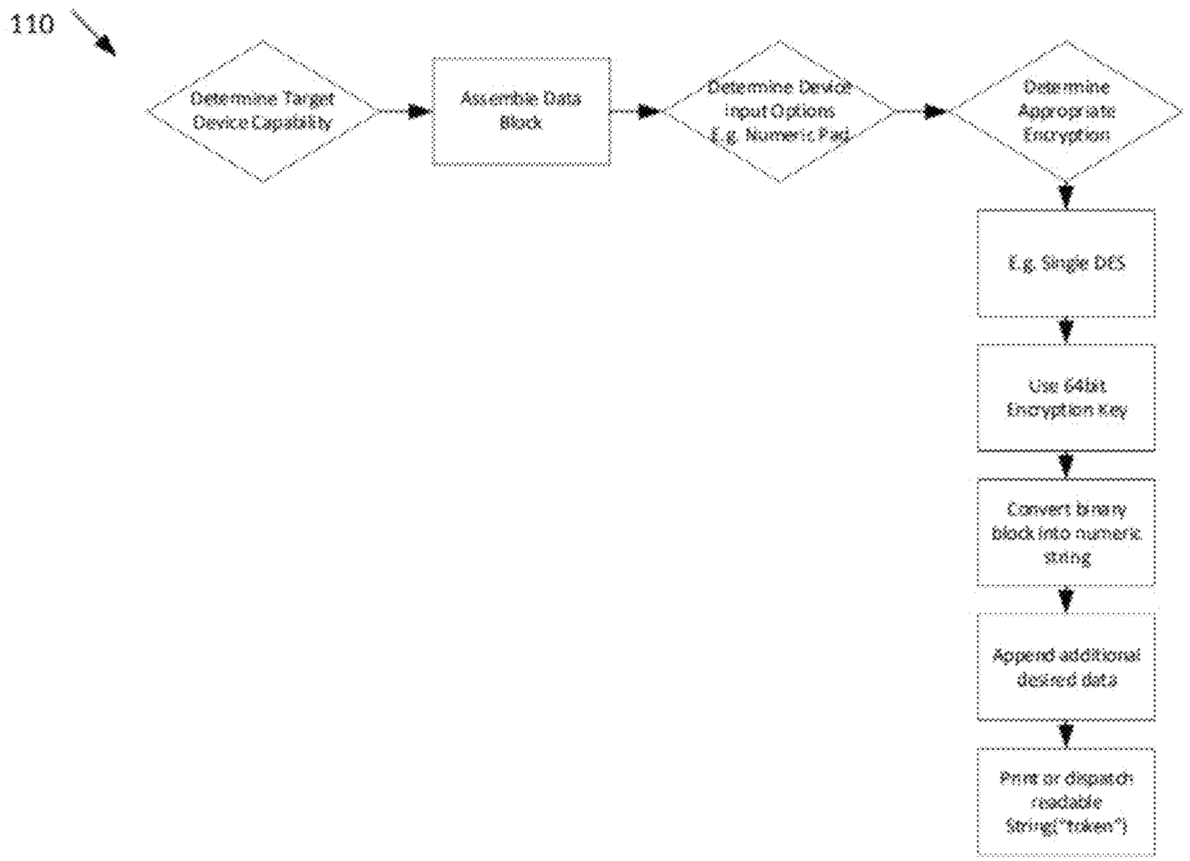
FIG. 8 is an illustration showing further functionality of the code generation.

In the arrangement shown, as one example, and specifically with reference to FIG. 5. system 10 includes a controller having a user interface 410. The user interface may be limited to a keypad and/or display. The user interface may also include a communication interface 440,—having a radio frequency, a bluetooth, a camera, a microphone, and the like—and the ability to receive input for the processing unit 420. Furthermore, the controller may also include a storage unit 430 for use of storing programs to be executed by the processing unit 420, and the like.

Graphical User Interface:

In the arrangement shown, as one example, system 10 may include a graphical user interface at the access unit for a user or guest 410 and a graphical user interface for an administrator or owner using a computer system or mobile phone. Graphical user interface 410 of the controller at the access unit is formed of any suitable size shape and design and is configured to allow a user to view interact with, manipulate, and visually access the controller part of the system related to the access unit and information related thereto, and/or view various data pertaining to the access unit and/or object data and/or change the settings of the sensors and/or change the settings of the operation of the target device.

Graphical user interface 410 is an exemplary method by which systems of the present disclosure may make programming changes to the operation of the controller. Employing graphical user interface 410, enhances a user's interactions and/or an administrator's interactions in the form of awareness and knowledge of data within the controller or target device.

Display of Graphical User Interface: In the arrangement shown, as one example, system 10 might also include a graphical user interface display for the owner or administrator when connected to a computer system 310 or mobile device 320. Such a graphical user interface display may be configured to show and display information, including data, for review and interpretation of a user or plurality of users, or of a plurality of users interacting with one another and/or target devices. In the arrangement shown, as one example, an interactive user interface display is formed of a display screen, such as that of a desktop computer, laptop computer, monitor, tablet, smart phone, smart TV, projector, virtual reality display or any other device or form of a display. In the arrangement shown, as one example, interactive user display comprises a series of interactive user display pages, however, the interactive user display may consist of a single page or any other method of displaying information on a display as could be adapted to various size screens, devices, or user preferences. The interactive user display can display various parameter and/or rights and/or conditions and/or risk elements pertaining to an appliance or target device.

User (or Plurality Thereof):

In the arrangement shown, as one example, system 10 may include a user. User may be any user interacting with or utilizing the system 10. This may include viewing, controlling, analyzing, manipulating, and/or interacting with system 10. User is not limited to a single user but may be a plurality of users. Furthermore, user may include an owner, an administrator, a supervisor, an employee, a guest, and a plurality of individuals or groups seeking access to the secured appliance and/or appliances.

Computing Platform:

In the arrangement shown, as one example, system 10 includes a computing platform (or "computer", or "computer platform") 310. Computing platform is formed of any suitable size, shape, and design and is configured to provide computing support, power, and computing processing for both onboard computing functionality as well as communication for off-board or server computing functionality.

In the arrangement shown, as one example, system 10 includes a computer 310 or computing device such as a smartphone 320. A computer or computing device is formed of any suitable size, shape, and design and is configured to provide for the main computing processing and implementation of handling of data including code generation and management of rights and/or features and/or credentials related to target devices. Data processing and analysis may include, but is not limited to, artificial intelligence of sorting and organizing commands associated with any given user and/or encrypted token, which may include updating controller or switch and/or lock rules in an access unit as it pertains to an appliance or target device, and the like.

Sensor System and Other Features:

In the arrangement shown, as one example, system 10 includes a sensor system such as motion detectors and/or camera working in concert with a lock or switch in an access unit. Sensor system is formed of any suitable size, shape, and design and may include one or more sensors and/or one or more sensing technologies. As one example, the sensor system is configured to detect and communicate information related to the target device as well as its surroundings and/or environment. Such gathered information is processed by the controller and an appropriate response can be initiated based on rules extrapolated from prior input tokens containing various commands.

Application and Application Server:

In the arrangement shown, as one example, system 10 may comprise remote servers, databases, and/or computers 310 that fulfill the functions disclosed and described herein. In the embodiment depicted, system 10 comprises an application server residing on a computer or computing device such as a mobile phone 320. Application server comprises one or more computer systems or computing devices adapted to collate data related to a variety of target devices or appliances, creating and/or storing rules and managing credentials and access control with an ultimate purposes of issuing instructions used in generating code 110, i.e. a token containing instructions corresponding to a particular controller of an appliance or target device. Application server is adapted to query databases and to retrieve information related to various aspects, features and functionality of system 10, its users, and monitoring.

As one of ordinary skills in the art may understand, application server, database, and other databases mentioned herein may be implemented in one or more servers. Furthermore, each may be on multiple servers to increase system efficiency, especially when handling large data gathering, following extended guidelines, extended ranges, ranges discussed herein. Additionally, multiple servers may have mirrored data to prevent data loss in case of disk failure and/or to decrease access and response times for database queries. In alternative embodiments, application server, and other database procedures may be carried out on computer-readable instructions and data stored on the administrator's mobile computing device or a user's mobile device 350, as it may apply.

In addition to the above identified features, options, controls, and components, system 10 may also include other features and functionalities, among other options, controls, and components.

In Operation:

In one example, an example of operation, a command parameter is used and can include a plurality of references. In one example, the command parameter might include A-O references, each having a different parameter. For example, A may be for a command type, B may be for a serial number, C may be for a user category, D may be used for an access type, E may be for an access count, F may be for allowing access before a designated check-in time, G may be for check-in date and/or time, H may be a checkout date and/or time, I may be for a duration, J may be for passcode options, K may be for personal passcode, L for override options, M for failed entry rules, N for consequence of failed entries, and O to set the consequence at expiry.

In another example of use, an administrator and/or owner may print a token on a receipt and send a message with the token to a user. At an appropriate date and time, and upon a first entry, the user would insert the token into the lock and thereafter use a code, for a subsequent duration of time—such as a four digit code or the like- to gain entry and/or access for a number of minutes, days, hours, weeks, etc. In this example, after a checkout date, the user will no longer be able to enter using the four digit code.

In another example, the above may apply to a piece of equipment such as a vehicle, the vehicle having an ignition device which is retrofitted with an access unit 130 maintained by a controller 120. Assuming a guest wants to use the vehicle for three hours or some other duration. The administrator or owner, using a computing device or mobile phone will select such options for the target device (i.e. vehicle) and generate an encrypted token containing the relevant commands for a given duration and/or date range and give it to the guest. Once the guest inputs the token into the controller's keypad installed in the vehicle, it will provide operation of the ignition of the vehicle for the duration or other such parameters or credentials encrypted in the token. In this way, and in this one example, the controller would decrypt the token command string, using the appropriate decoding key and/or paired key for the vehicle ignition controller and convert such string into a set of commands or routines for operating the ignition. Further expansion of the commands may include execution for the controller enabling, for example, the control for allowed speed or allowed travel distance, ability to open a trunk or refill a gas tank. A controller connected to a GPS device would be able to dictate commands associated with a travel location. In another example, a controller installed on a crane or forklift could decode commands related to limits of lifting height or weight. In another example, a controller on a tractor could allow the operation of a loader, and depending on the user's credentials, would prevent operation of a backhoe or other implements or attachments. In addition, encrypted token information could include consequences for going over any limits or thresholds, for example attempting to pick up a heavier load than prescribed could result in a siren and/or going over a speed limit or entry into an unauthorized area could result in delayed or subsequent non-ignition requiring another "release" type token from an administrator in order to resume operations.

In another example, the administrator and/or owner may accomplish providing a similar access to the guest through sending an image, a QR code, a sound file, an electronic RF key or permission for bluetooth access on an application on the user's mobile device or the like, which would allow the user to transfer such encoding to the controller, as opposed to inputting a token manually into a keypad, to gain ignition access for a user to a vehicle.

In another example, instead of an administrator and/or owner printing a token on a receipt or sending the token to the user via short message service, a user may download an appropriate application—likely available for download to a smart device—which would enable the user to insert the token into the lock 10, wirelessly using bluetooth, a sound file, barcode, QR code or the like. In this way, the downloaded application provides ease for a user. The user can then receive tokens and utilize the app for various equipment access and/or appliance access as provided by the administrator and/or owner. In this example, an owner may be enabled to control what devices and/or equipment a particular user can access and/or control, such as on a construction site and the like.

In the arrangement above, the device and/or lock system 10 is embedded with a predetermined set of rules which can receive new rules or permutation of rules with associated embedded numeric tokens. The device, wherever located, can decrypt these rules and provide functionality of the lock as needed for control of the target device. In this way, the controller can then be manipulated to act in various ways, even if any rules weren't pre-programmed at the outset but delivered later. Based on the facilities or features of a target device and any user's respective credentials the system allows for custom reconfiguration or reprogramming of the operation of the target device for a particular instant without connection to a communication network. In this way, new sets of rules are delivered to the lock and controller and the lock and controller is configured to receive new instructions through the encrypted token as included with permission for a user to access.

Any encryption keys or such algorithm methodology can be changed, manipulated or expanded using programming tokens.

The capability of the programming or instructions for access tokens depends on: The type of device; Intended functions of the apparatus; Desired encryption complexity; Input method; And the desired token length. Simple devices with limited apparatus functions require less commands and hence shorter length of tokens. Input methods using numeric keypads can remit less information (per given string length) than character inputs inputted into alphanumeric keypads. Auxiliary input techniques such as Bluetooth, WiFi, RF, QR, Bar Codes, or sound tones can provide tokens containing more elaborate instructions and commands.

Example: In one arrangement, encryption of human readable text means a covert and/or indiscernible description. As one example, only for ease of explanation. An administrator may verbally provide the following sentence to a user, "the chicken crossed the road". To the user, this sentence doesn't mean anything. However, when the user relays this information into the access unit and/or controller, the information is translated into meaning for functionality, access, limitations of functionality and/or access, and the like.

Figure 3:
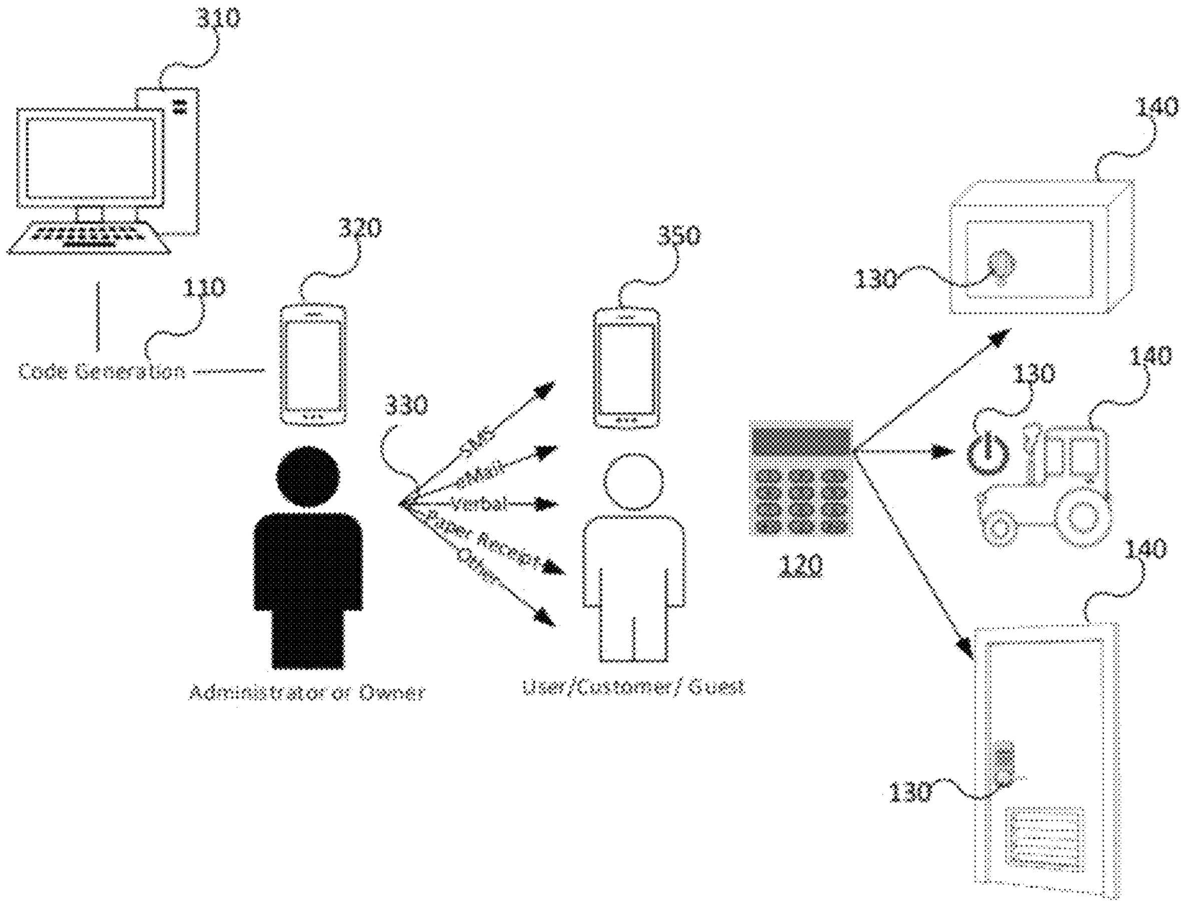
FIG. 3 is an illustration of one embodiment showing interactions of an administrator and user with the system disclosed herein; the view showing various computing devices; the view showing an access unit which can be associated with various target appliances and/or target devices.
Figure 4:
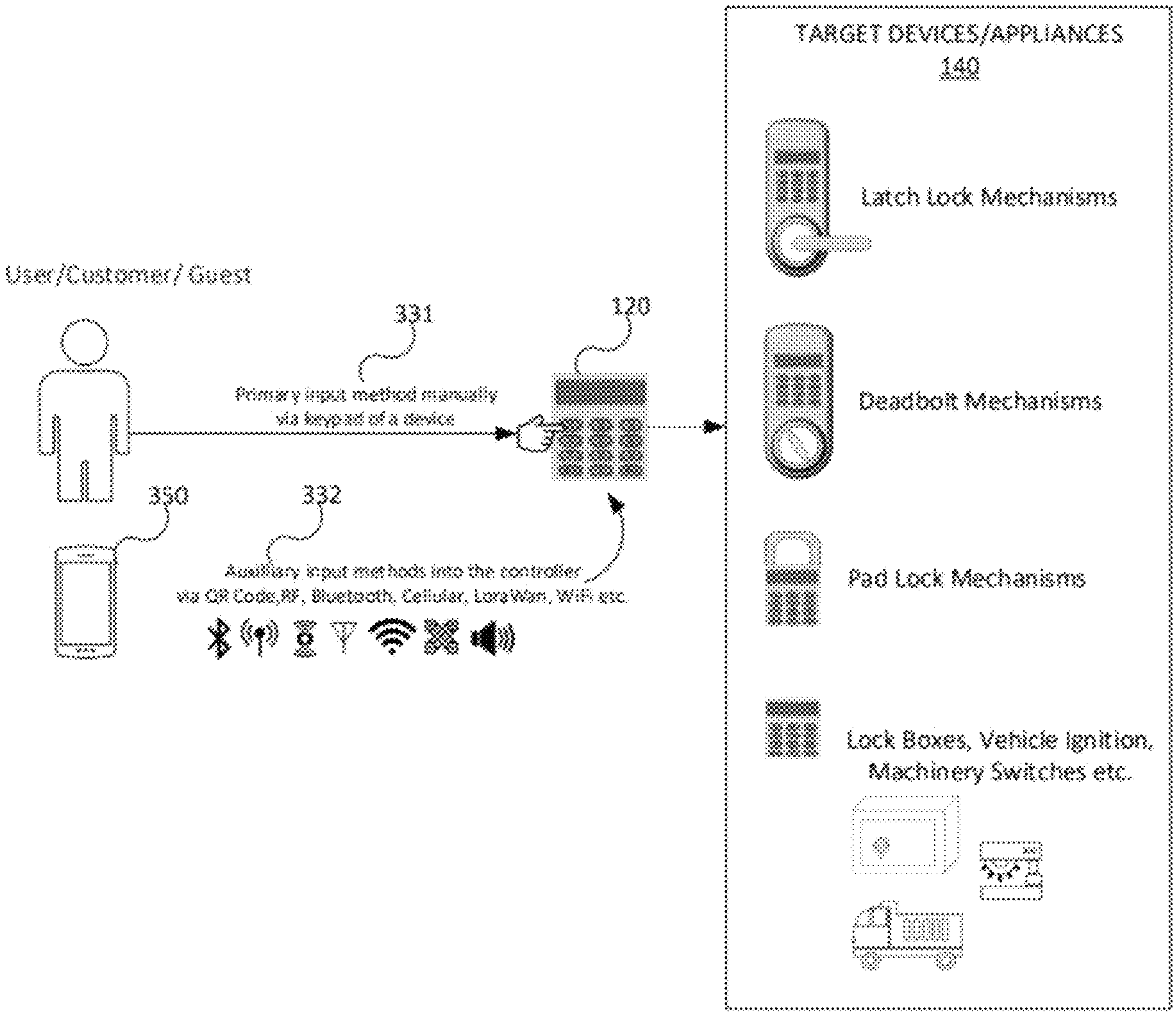
FIG. 4 is an illustration of one embodiment, showing an administrator and a user controlling targets, via access units, integrated within the controller; the view showing a user operating with the access unit.

In the arrangement shown, as one example, and with reference to FIG. 3, Computing device 320, of the administrator, can generate token and/or command parameters. The administrator can use this token and/or pass this token along, and the like. In this way, a user may accept the command parameters and/or tokens on a computing device 350 of a user. The computing device 350, in this way, of the user acts as a conduit for relaying the token and/or command parameters. In this way, the computing device 350 of the user does not generate a command parameter and/or token.

These and other examples of process and methods of use are incorporated by reference.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed:

1. A lock and controller system, comprising:

a code generator;

the code generator having at least one processor;

wherein the code generator resides on a computer system or computing device;

wherein the code generator generates, by the at least one processor, at least one command parameter;

wherein the at least one command parameter is encrypted in an encrypted token;

wherein the encrypted token, containing the at least one command parameter, is in human readable text;

the human readable text having contents and instructions, the contents and instructions being encrypted during possession by a user of a target device;

wherein the code generator uses an algorithm commensurate with a distant controller on a remote appliance, which when decrypted by the controller is capable of regulating the function of the remote appliance in accordance with a set of instructions compiled and issued by the code generator;

a controller;

the controller having at least one processor;

the controller having a memory;

the controller being operably connected to a lock and a switch;

the controller having input ports for receiving information;

the controller having output ports for regulating peripherals and extracting information;

the controller having a user interface;

wherein the user interface can operably receive a user's input;

the controller configured to operate offline;

the controller configured to be operated by a user with granted access;

the controller regulating a target device, the target device being an appliance;

the controller configured to decrypt input previously generated by the code generator;

the controller configured to convert the input previously generated by the code generator into commands related to the target device;

the lock and the switch operably connected to the controller being operably connected to the target device;

wherein the controller can operate autonomously and independent of any connectivity and communication to another command center;

wherein the controller can operate autonomously and independent of the presence of an owner or administrator;

an access unit;

wherein the access unit includes the lock operably connected to the controller;

wherein the access unit includes the switch operably connected to the controller;

wherein the access unit is controlled by the at least one command parameter;

an appliance;

wherein the appliance is the target device fit with the access unit;

wherein the appliance is configured to receive input of the at least one command parameter;

wherein the at least one command parameter includes a set of conditions of usage of the appliance;

wherein the set of conditions are configured by an administrator;

wherein the administrator generates the set of conditions using the code generator.

2. The system of claim 1, further comprising:

wherein the access unit is an ignition switch;

wherein access to the appliance is controlled by the ignition switch.

3. The system of claim 1, further comprising:

wherein the access unit is a mechanical locking mechanism.

4. The system of claim 1, further comprising:

wherein the access unit is a locking mechanism;

wherein access to the appliance is controlled by the locking mechanism.

5. The system of claim 1, further comprising:

wherein the appliance is a vehicle.

6. The system of claim 1, further comprising:

wherein the appliance is a structure.

7. The system of claim 1, further comprising:

wherein the appliance is a premises.

8. The system of claim 1, further comprising:

the controller having a keypad.

9. The system of claim 1, further comprising:

a graphical user interface;

the graphical user interface having a display.

10. The system of claim 1, further comprising:

wherein the at least one command parameter includes a plurality of references;

wherein the plurality of references control the access unit based on a set of rules.

11. The system of claim 1, further comprising:

wherein the at least one command parameter includes a plurality of references;

wherein the plurality of references control the appliance based on a set of rules.

12. The system of claim 1, further comprising:

a user;

wherein the user transfers the at least one command parameter into the controller using manual input.

13. The system of claim 1, further comprising:

wherein the user receives the at least one command parameter on a second computing device, in the encrypted token;

wherein the user can transfer the command parameter from the second computing device to the controller.

14. The system of claim 1, further comprising:

wherein the user receives the at least one command parameter in the encrypted token, received by a short message service.

15. The system of claim 1, further comprising:

wherein the user receives the at least one command parameter in the encrypted token, received by a barcode.

16. The system of claim 1, further comprising:

wherein the user receives the at least one command parameter in the encrypted token, received by a QR code.

17. The system of claim 13, further comprising:

wherein the user transfers the at least one command parameter in the encrypted token, by a sound tone.

18. The system of claim 13, further comprising:

wherein the user receives the at least one command parameter in the encrypted token, received by a human readable text.

19. The system of claim 1, further comprising:

the controller having an alphanumeric keypad;

wherein the at least one command parameter is a code;

a user;

wherein the user receives the code from the administrator verbally.

20. The system of claim 1, further comprising:

the controller having an alphanumeric keypad;

wherein the at least one command parameter is a code;

a user;

wherein the user receives the code from the administrator by a paper receipt.

21. The system of claim 1, further comprising:

the controller having an alphanumeric keypad;

wherein the at least one command parameter is a code;

a user;

wherein the user receives the code from the administrator by electronic mail.

22. The system of claim 1, further comprising:

the controller having an alphanumeric keypad;

wherein the at least one command parameter is a code;

a user;

wherein the user receives the code from the administrator by a short message service.

23. The system of claim 1, further comprising:
the controller having an alphanumeric keypad;
wherein the at least one command parameter is a code;
a user;
wherein the user enters the code manually into the keypad.

24. The system of claim 1, further comprising:
a master key;
wherein the master key provides access for a plurality of users.

* * * * *